UNITED STATES PATENT OFFICE.

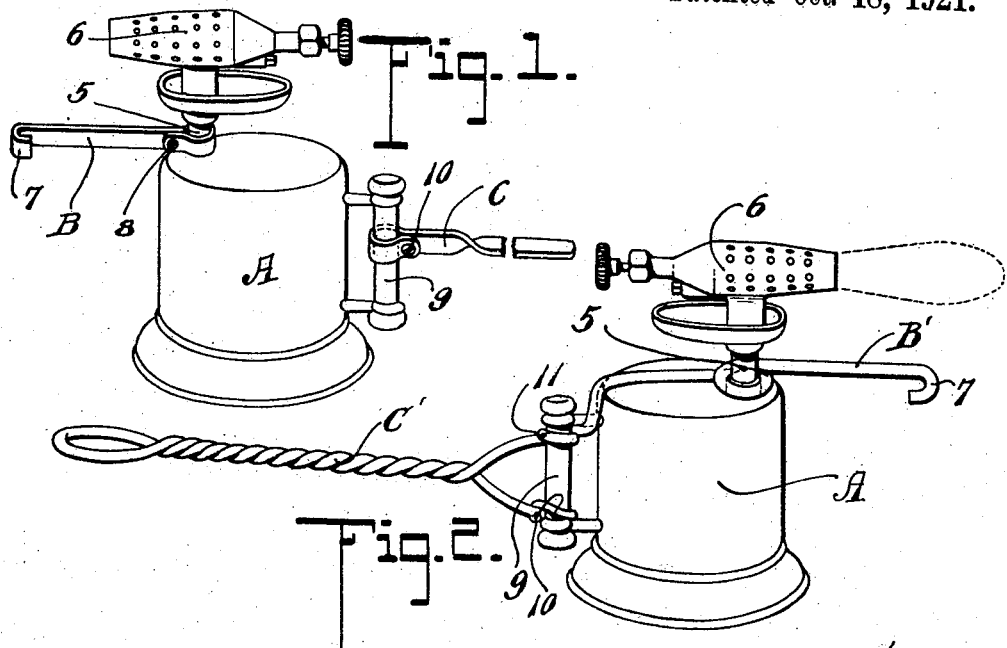
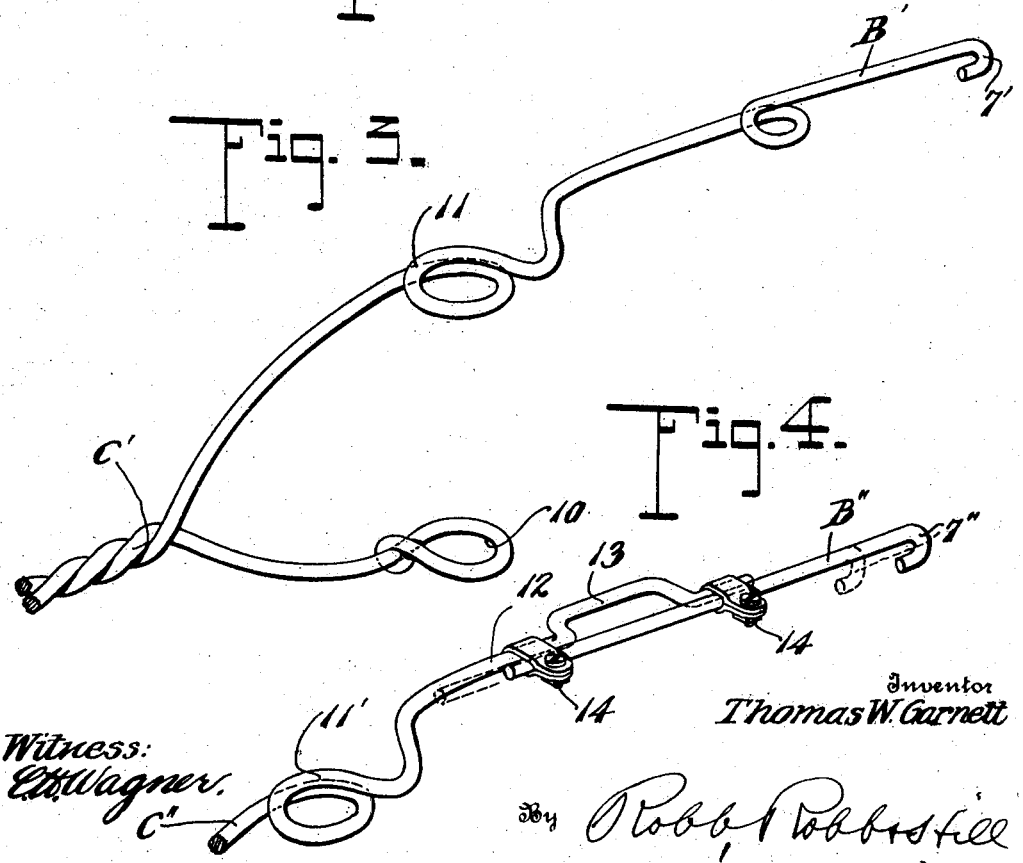

THOMAS W. GARNETT, OF TOPEKA, KANSAS.

ATTACHMENT FOR BLOWTORCHES.

1,393,999.  Specification of Letters Patent.  Patented Oct. 18, 1921.

Application filed November 10, 1920. Serial No. 423,017.

*To all whom it may concern:*

Be it known that I, THOMAS W. GARNETT, a citizen of the United States, residing at Topeka, in the county of Shawnee and State of Kansas, have invented certain new and useful Improvements in Attachments for Blowtorches, of which the following is a specification.

All soldering processes, ordinary or special, require the use of heat and the success of each operation, no matter what process or system is employed, is dependent, more or less, upon the application of heat to and upon a particular spot or surface and the maintenance of such heat at a fixed and predetermined degree.

Appreciating these facts, and with the knowledge gained from long experience, particularly with systems and processes for soldering deep receptacles, I have invented means to be hereinafter described whereby it is possible to direct and regulate the heat required for soldering with a higher degree of accuracy and with greater facility than heretofore attainable. At the same time, my invention may be used in other arts, such as in brazing, and in painting, for the removing of old paints, and in many other operations.

Most frequently, the blow-torch is the mode of applying heat in soldering operations. For this reason, I have illustrated and described my invention as applied thereto although the means I have devised for carrying out my discoveries is equally applicable to other heat supplying apparatus.

As has already been indicated, my invention has for its primary object to provide instrumentalities whereby the flame from a blow-torch or similar device may be instantly and accurately positioned with relation to any particular object or surface, with a predetermined portion of the flame structure playing thereupon, it being contemplated that there shall be guide means for determining the position of the flame and holding or grip means for the torch, the guide means being adapted to predetermine the portion of the flame structure to be employed.

A further object of my invention is to provide attachments of the character indicated which may be readily affixed to and removed from the heat-supplying means, and further objects and advantages will become apparent as the description of my invention proceeds.

For a full understanding thereof reference is to be had to the specification which follows and to the accompanying drawings in which:—

Figure 1 is a side elevation of an ordinary blow-torch with my invention applied thereto, the extension handle being partly broken away.

Fig. 2 is a similar view of another embodiment of my invention.

Fig. 3 is an enlarged perspective view of one embodiment of my invention, the extension handle being partly broken away; and Fig. 4 is a fragmental view of a modified form thereof.

Throughout the following detail description and in the several figures of the drawing, similar parts are referred to by like reference characters.

The letter A is used to designate a conventional gasolene blow-torch, to which I attach a guide member B, shown in Fig. 1 constructed of strap metal, the connection thereto being best made about the support 5 for the burner 6. Said guide member B which may also be designated as a foot rest or merely as a rest, is of such length that it will, when brought to bear against the surface of the object to be heated, allow a predetermined portion of the flame structure to play upon the object.

The end of the rest is preferably bent as indicated at 7 to provide against scratching or damaging any object against which it may rest and to admit the shifting of the blow-torch from one position to another with precisely the same portion of the flame structure in contact with the exposed surface.

Any suitable fastening means, such as the screw 8, may be employed to hold the opposite end of the rest, which end is bent around said support 5, in proper adjustment, so that the foot rest B will be in vertical alinement with the blow-torch flame.

The handle or holding means C may also be constructed of strap metal, similar to that used in the foot rest B and may be attached to the handle 9 of the blow-torch in the same manner as the foot rest is attached to the burner support 5. The screw 10 should frictionally hold the extension handle C in any selected position with relation to the torch as may be required by the operations to be performed or the will of the operator dictates. Said extension handle C may be twisted to form a more convenient grip means for directing and holding the blow-torch.

Passing to Figs. 2 and 3, another embodiment of my invention is illustrated, the material employed being wire of suitable gage and composition. In this form, the foot rest B' and the extension handle C' are integrally formed, one end of the wire of which constructed being bent around the burner support 5 and projecting outwardly therefrom in the direction of and in vertical alinement with the flame, to form the foot rest B', the opposite end 10 being twisted about the lower part of the handle 9 of the blow-torch, while the intermediate portion of the material is bent about the upper part of said handle 9 as indicated at 11 and twisted upon itself to form a convenient and handy extension handle C'. Independent fastening means are unnecessary to lock the extension handle C' and foot rest B' in place in this form of my invention for its correct position is determined by the manner in which it is attached to the blow-torch.

In Fig. 4, a further embodiment of my invention is shown. In this form, the foot rest B'' and extension handle C'' are made of separate pieces of wire material, the extension handle C'' being bent about the blow-torch handle 9 in precisely the same manner as hereinbefore described, while the free end 12 of the portion of the material which projects inwardly of the blow-torch from the bend 11' is bowed as indicated at 13. The foot rest B'' may be straight except for the bent protective end 7, the purpose of which has already been discussed, and is arranged to be detachably connected with the free end of the extension handle 12 by the clips 14 placed adjacent to the opposite ends of the bowed portion 13. Said clips are made to frictionally engage and to release the two members by merely tightening or loosening a nut working upon a bolt passing through the free ends thereof. By this construction, my invention may be attached to any form of blow-torch, the bowed portion 13 being arranged so that the free end 12 of the extension handle will pass around and engage one side of the burner support 5 irrespective of the latter's position upon the top of the blow-torch. The foot piece B'' when held within the clips and in engagement with the free end 12 of the extension handle C'' will press against the opposite side of the burner support 5, the tightening of the clips 14 holding the two parts in rigid engagement one with another and with the burner support. By this arrangement the extension handle C'' and the rest B'' are brought into continuous alinement, the alinement of the foot rest B'' with the frame being thus provided for. At the same time, the clips 14 provide means whereby the foot piece B'' may be made to project from the blow-torch A any desired distance, the sliding of the foot rest B'' outwardly or inwardly adjusting the position of any surface to be worked upon with relation to the flame structure.

The utility of my improvements are instantly perceptible. Not alone in soldering is the need for gage and guide means to prevent the use of the blow-torch too close to or too remote from the object sought to be heated but this need is also found in brazing, and in the removal of old paint, and numberless like operations. In soldering, especially deep receptacles, such as repairing ice cans, such instrumentalities as I have invented are absolutely necessary, their need being paramount when the soldering system employed requires alternately concentrated and diffused heat.

In such special processes of soldering as require countersinking of the part to be repaired, the success of the whole scheme of operation is dependent upon the ability of the operator to apply heat with precision as to temperature and direction. With my invention, adjustment of the blow-torch whereby the position of the flame is fixed, is arranged for, and by such adjustment the flame may be made to play upon any spot with accuracy and at the temperature particularly required for the operation. The attachments I have described serve, in addition to the foregoing, as means for balancing or steadying the blow-torch when in any required position.

In the embodiments of my invention where no provision is made for changing the projection of the foot piece B from the blowtorch, it is to be presumed that the proper adjustment will be predetermined and the foot piece made in accordance therewith.

While I have illustrated my invention in several forms, I do not wish to be bound to the specific forms of illustrated, as changes, alterations and modifications within the scope of the claims hereto appended are to be resorted to when desired.

What I claim as new and desire to procure by Letters-Patent of the United States, is:—

1. An attachment for a blow-torch, comprising a member having means at one end whereby to attach said member to the burner support of said torch, said member being adapted to extend laterally from said torch in alinement with the flame from said burner and to engage with its free end the object to be heated to limit the approach of said burner to said object, said free end being rounded to prevent scratching of said object.

2. An attachment for a blow-torch, comprising a member having means at one end whereby to attach said member to said torch, said member being adapted to extend laterally from said torch in alinement with the flame therefrom and to engage with its free end the object to be heated to limit the approach of said torch to said object, and a handle member having means at one end whereby to attach said handle member to said torch, said handle member being adapted to extend laterally from said torch in the opposite direction to said first mentioned member.

3. An article of manufacture adapted to be attached to a blow-torch for the purpose of facilitating handling and supporting said torch, comprising a wire having a forwardly projecting foot piece or support, a rearwardly projecting handle, and intermediate torch-engaging portions.

4. An article of manufacture adapted to be attached to a blow-torch for the purpose of facilitating handling and supporting said torch, comprising a wire having a forwardly projecting adjustable section forming a foot piece or support, a rearwardly projecting handle section, and means connecting said sections together and to the blow-torch.

In testimony whereof I affix my signature.

THOMAS W. GARNETT.